United States Patent [19]

Kerastas

[11] Patent Number: 5,000,478
[45] Date of Patent: Mar. 19, 1991

[54] SHOCK ABSORBER WITH DOPPLER FLUID VELOCITY SENSOR

[75] Inventor: Michael W. Kerastas, Petersburg, Mich.

[73] Assignee: Monroe Auto Equipment Company, Monroe, Mich.

[21] Appl. No.: 496,195

[22] Filed: Mar. 15, 1990

[51] Int. Cl.$^5$ .................... B60G 17/015; B60G 11/08
[52] U.S. Cl. .................................... 280/707; 280/709; 189/285; 189/299
[58] Field of Search ............... 280/707, 702, 709, 840; 267/24.13; 188/299, 285, 319, DIG. 1, DIG. 2

[56] References Cited

U.S. PATENT DOCUMENTS

| | | | |
|---|---|---|---|
| 4,090,407 | 5/1978 | Shuler et al. | 73/290 V |
| 4,595,072 | 6/1986 | Barnea | 280/707 |
| 4,600,215 | 7/1986 | Kuroki et al. | 280/707 |
| 4,616,848 | 10/1986 | Sugasawa et al. | 280/707 |
| 4,671,533 | 6/1987 | Asami et al. | 280/DIG. 1 |
| 4,674,768 | 6/1987 | Morra | 280/707 |
| 4,798,369 | 1/1989 | Geno et al. | 280/707 |
| 4,848,790 | 7/1989 | Fukunaga et al. | 280/707 |
| 4,909,536 | 3/1990 | Hale | 280/707 |
| 4,934,731 | 6/1990 | Hiwatashi et al. | 280/707 |
| 4,943,083 | 7/1990 | Groves et al. | 280/707 |
| 4,949,989 | 8/1990 | Kakizaki et al. | 280/707 |

FOREIGN PATENT DOCUMENTS 8702817  6/1987  Fed. Rep. of Germany .
2177475  7/1985  United Kingdom .

Primary Examiner—Richard A. Bertsch
Attorney, Agent, or Firm—Harness, Dickey & Pierce

[57] ABSTRACT

A hydraulic activator operable to change a suspension characteristic in response to changes in the velocity of damping fluid flowing through a flow passage provided in flow control valving within the shock absorber. The hydraulic activator comprising a pressure cylinder forming a working chamber operable to store damping fluid and a reservoir cylinder coaxial therewith. A piston is disposed within the pressure cylinder defining an upper and lower portion of the working chamber. The activator further comprises a first transducer for emitting ultrasonic waves across the flow passage. The ultrasonic waves emitted by the first transducer are received by a second transducer. A frequency detection circuit determines the difference in frequency between the emitted and received ultrasonic waves and generates an output in response thereto. A central processor calculates the fluid velocity and causes a control circuit to change a suspension characteristic of the shock absorber.

29 Claims, 4 Drawing Sheets

SHOCK ABSORBER WITH DOPPLER FLUID VELOCITY SENSOR

BACKGROUND OF THE INVENTION

1. Field of the Invention

This invention relates to vehicle suspension systems, and more particularly to a method and apparatus for determining the relative velocity between the telescopically movable components of a hydraulic damping device.

2. Description of Related Art

Damping devices ("dampers") are used in conjunction with automotive suspension systems to absorb unwanted vibration which occurs during driving To absorb this unwanted vibration, dampers are generally connected between the sprung mass ("body") and the unsprung mass ("wheel") of the automobile. A piston is located within the damper and is connected usually to the body of the automobile through a piston rod. Because the piston valving and orifices act to restrict the flow of damping fluid within the working chamber of the damper when the damper is compressed, the damper is able to produce a damping force which counteracts the motion of the wheel and/or body which would otherwise remain undamped. The greater the degree to which the flow of damping fluid within the working chamber is restricted by the piston, the greater the damping forces which are generated by the damper.

In selecting the amount of damping that a damper is to provide, three vehicle performance characteristics are often considered: ride comfort, vehicle handling and road holding ability. Ride comfort is often a function of the spring constant of the main suspension springs of the vehicle, as well as the spring constant of the seat, tires, and the dampers. Vehicle handling is related, among other things, to variation in the body's attitude (i.e., roll, pitch and yaw). For optimum vehicle handling, relatively large damping forces are required to avoid excessively rapid variation in the body's attitude during cornering, acceleration, and deceleration. Road holding ability is generally a function of the amount of variation in the normal load between the tires and the ground. To optimize road holding ability, larger damping forces are required when driving on irregular surfaces to minimize the normal load variations and to prevent complete loss of contact between the wheels and the ground.

To optimize ride comfort, vehicle handling, and road holding ability, it is generally desirable to have the damping forces generated by the damper be responsive to the frequency of the input from the road or from the body. When the input frequency is approximately equal to a natural frequency of the body (e.g., approximately between 1-2 Hz), it is generally desirable to have the damper provide relatively large damping forces (relative to critical damping) to avoid excessively rapid variation of the vehicle's attitude during cornering, acceleration and deceleration. When the input frequency is between 2-10 Hz mostly from the road, it is generally desirable to have the damper provide low damping levels so as to produce a smooth ride and allow the wheels to follow changes in road elevation. When the input frequency from the road is approximately equal to the natural frequency of the automobile suspension (i.e., approximately 10-15 Hz), it is desirable on one hand to have relatively low damping forces to provide a smooth ride, and on the other hand provide high damping forces so as to minimize variation in tire normal load and prevent complete loss of contact between the wheels and the ground.

Various methods are known for selectively changing the damping characteristics of a damper in response to an input frequency from the road PCT Application No. PCT/US 87/00615 discloses one such method. The apparatus used to perform the method comprises a pressure cylinder forming a working chamber having first and second portions operable to store damping fluid. The apparatus further comprises a first valve for controlling the flow of damping fluid between the first and second portions of the working chamber during compression of the apparatus. In addition, the apparatus also comprises a pressure chamber in fluid communication with the first portion of the working chamber and the first valve. A solenoid is also provided for regulating the flow of damping fluid between the pressure chamber and the second portion of the working chamber. A second valve is further provided for controlling the flow of damping fluid between the first and second portions of the working chamber during rebound of the apparatus.

When such methods are used for changing the damping characteristics of a damper, they often require information regarding the movement of the piston within the pressure cylinder of the damper. This information not only identifies whether the damper is in compression or extension, but also can provide information concerning the magnitude and frequency of suspension motion.

Several methods are known for obtaining information regarding the movement of the piston within the pressure cylinder. PCT Application No. PCT/US87/00615 uses a pressure sensor as well as an accelerometer to determine whether the damper is in compression or extension, as well as to obtain information regarding the road surface. U.K. patent application No. GB 2 177 475A and West German patent No. G 87 02 817.4 disclose suspension damping devices incorporating ultrasonic wave systems for determining positional displacement information. The positional displacement information is obtained by determining the time from transmission of an ultrasonic wave to when its reflected "echo" wave is received. Both references use a single transducer acting to emit and receive the pulsed ultrasonic waves. Use of a single transducer necessitates incorporation of costly ultrasonic wave modulation and calibration circuitry to ensure coherent wave detection. Additionally, the transducers in both references are mounted such that the piston acts to reflect the ultrasonic waves.

SUMMARY OF THE INVENTION

Accordingly, it is a primary object of the present invention to provide a method for sensing the velocity of damping fluid flowing through orifices provided in the telescopically movable components of a hydraulic actuator so as to provide information for selectively controlling the damping, motion, position and/or forces generated by the actuator.

Another object of the present invention is to provide a hydraulic damper or actuator capable of providing fluid velocity information using ultrasonic sound waves.

Another object of the present invention is to provide a method and apparatus for generating continuous real-time electrical signals for selectively controlling suspension characteristics with the hydraulic actuator which is responsive to the input frequencies of the road.

It is a further object of the present invention to provide a method and apparatus for selectively controlling suspension characteristics of a vehicle in response to changes in the fluid velocity of damping fluid flowing through system piping, the piston valving and/or base valving using a sonar, preferably within the ultrasonic spectrum.

A further object of the present invention is to provide a direct acting, telescopic, hydraulic shock absorber having a high degree of flexibility with respect to vehicular applications. In this regard, a related object of the present invention is to provide a hydraulic actuator which is relatively low in cost and relatively easy to maintain.

According to the preferred embodiment of the present invention, the hydraulic actuator comprises a direct acting hydraulic damper having first transducer means for emitting sound waves and second transducer means for receiving sound waves. The first and second transducer means are mounted to opposite lateral surfaces of an orifice or flow passage, such as that provided in piston valving which is coaxially disposed within the pressure cylinder of the shock absorber. Electrical leads passing through the piston rod and piston connect the individual transducers to signal generating and processing circuitry.

According to the method of the present invention, a wave generating circuit excites the first transducer means ("transmitter") so as to produce a constant frequency ultrasonic wave. The transmitter emits ultrasonic waves of a predefined frequency and duration through the damping fluid medium flowing through an orifice or passage during operation of the suspension system. The emitted ultrasonic waves are received by the second transducer means ("receiver") after propagating through the damping fluid. The receiver electrically communicates with a frequency detection circuit which detects the frequency of the received ultrasonic waves. Additionally, the wave generating circuit electrically communicates with the frequency detection circuit to provide a reference wave frequency emitted by the transmitter.

By using the difference in frequency between the emitted ultrasonic waves and the received ultrasonic waves, the velocity of the fluid flowing through an orifice in the piston valve (or base valve) or through a hydraulic line connecting the damper to an accumulator can be calculated by using a central processor. Accordingly, a continuous velocity determination can therefore be generated which ca be used by a piston control circuit to control the damping forces of the shock absorber. Such fluid velocity determinations can also be employed to detect the polarity (direction) of motion of the piston.

While the preferred embodiment discloses a twin-tube shock absorber, it is contemplated that the present invention is readily adapted to mono-tubes, struts, and other hydraulic actuators having vehicular application.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENT

Figure 1:
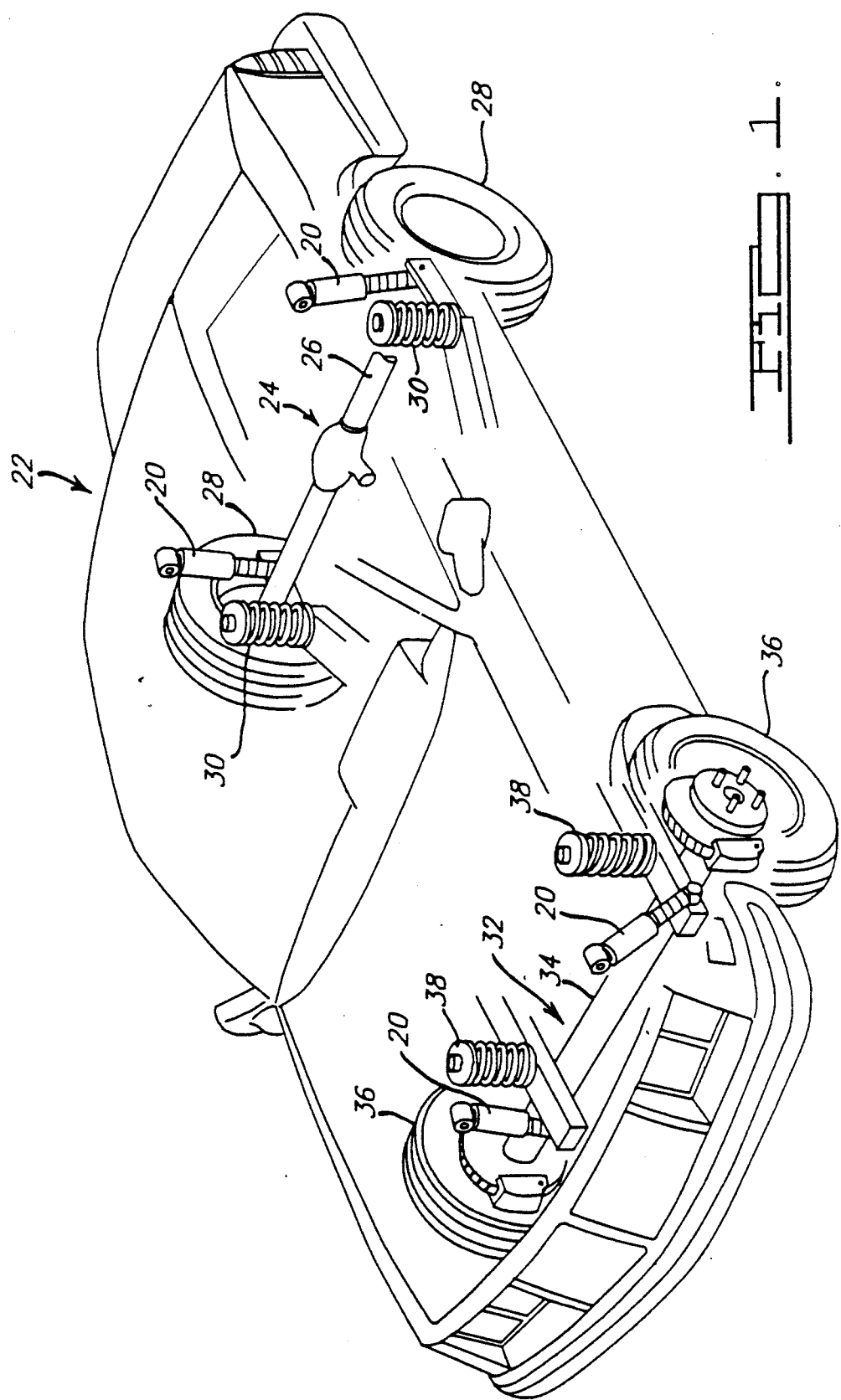
FIG. 1 is a diagrammatic representation of the direct acting hydraulic dampers according to a preferred embodiment of the present invention shown in operative association with a typical automobile.

Referring to FIG. 1, a plurality of four hydraulic actuators defined as dampers 20 in accordance with the preferred embodiment of the present invention are shown. The dampers 20 are depicted in operative association with a diagrammatic representation of a conventional automobile 22. The automobile 22 includes a rear suspension 24 having a transversely extending rear wheel assembly 26 adapted to support the rear wheels 28 of the automobile 22. The wheel assembly 26 is operably connected to the automobile 22 by means of a pair of dampers 20 as well as by the helical coil springs 30. Similarly, the automobile 22 has a front suspension system 32 including a transversely extending front wheel assembly 34 to support the front wheels 36. The front wheel assembly 34 is connected to the automobile 22 by means of a second pair of the dampers 20 and by the helical coil springs 38. The dampers 20 serve to damp the relative movement of the unsprung portions (i.e., the front and rear suspensions 32 and 24) and the sprung portion (i.e., the body 39) of the automobile 22. While the automobile 22 has been depicted as a passenger car, the damper 20 may be used with other types of automotive vehicles as well.

Figure 2:
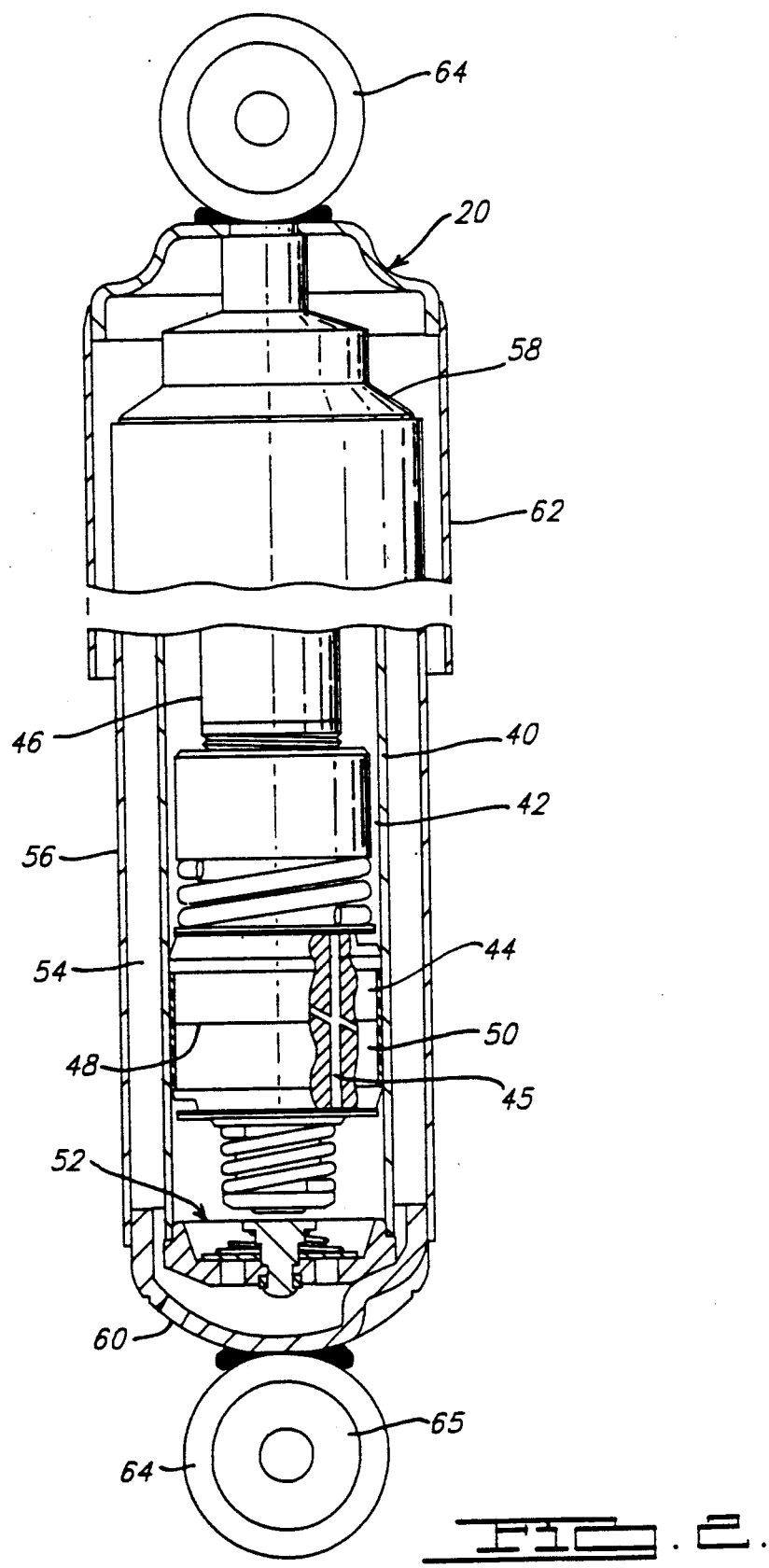
FIG. 2 is an enlarged side elevational view, partially broken away, of a direct acting hydraulic damper shown in FIG. 1.

With particular reference to FIG. 2, the damper 20 according to a preferred embodiment of the present invention is shown. The damper 20 comprises an elongated tubular pressure cylinder 40 defining a damping fluid containing working chamber 42. Disposed within the working-chamber 42 is a reciprocable piston 44 that is secured to one end of an axially extending piston rod 46. The piston 44 includes a circumferential groove 48 operable to retain a piston ring 50 as is well known in the art. The piston ring 50 is used to prevent damping fluid from flowing between the outer periphery of the piston 44 and the inner diameter of the cylinder 40 during movement of the piston 44. A base valve, generally designated by the numeral 52, is located within the lower end of the pressure cylinder 40 and is used to control the flow of damping fluid between the working chamber 42 and an annular fluid reservoir 54. The annular fluid reservoir 54 is defined as the space between the outer periphery of the cylinder 40 and the inner periphery of a reservoir tube or cylinder 58 which is arranged centrally around the exterior of the pressure cylinder 40. The operation of the base valve 52 may be of the type shown and described in U.S. Pat. No. 3,771,626 which is hereby incorporated by reference. It is contemplated, however, that the present invention is applicable to hydraulic actuator operable with or without base valves, check valve or the like.

The upper and lower ends of the damper 20 are provided with generally cup-shape upper and lower end caps 58 and 60 respectively. The end caps 58 and 80 are secured to opposing ends of the reservoir tube 56 by a suitable means such as welding. The damper 20 is shown as being provided with a dirt shield 62 which is secured at its upper end to the upper end of the piston rod 46. Suitable end fittings 64 having bushings 65 confined therein are secured to the upper end of the piston rod 46 and the lower end cap 60 for securing the damper 20 between the body and the wheel assembly of the automobile 22. Those skilled in the art will appreciate that, upon reciprocal movement of the piston 44, damping fluid within the pressured cylinder 40 is transferred between the upper and lower portions of the working chamber 42, and between the working chamber 42 and the fluid reservoir 54. By controlling the flow of damping fluid between the upper and lower portions of the working chamber 42, the damper 20 is able to controllably dampen relative movement between the body and the wheel of the automobile 22 so as to optimize both ride comfort and road handling ability.

The piston 44 is provided with a valve arrangement for controllably metering the flow of damping fluid between the upper and lower portions of the working chamber 42 during reciprocal movement thereof. One such valve arrangement is disclosed in PCT Application No. PCT/US87/00615 which is hereby incorporated by reference. It is contemplated, however, that the present invention may be used with other suitable valve arrangements as well as other suitable damping devices.

In accordance with the principles of the first preferred embodiment, the damper 20 further comprises an acoustical transmitter 66 and a receiver 68, both of which are secured to opposite lateral surfaces of orifice 45 which extends axially through piston 44. More particularly, transmitter 66 and receiver 68 are mounted in recessed passages 69. (See FIGS. 3 and 4). The transmitter 66 is used to generate ultrasonic waves having a predetermined resonant frequency $f_1$ in a direction generally transverse to the flow of fluid through orifice 45. Ultrasonics is the name given to sound waves having a frequency higher than those to which the human ear can respond (approximately 16 KHz). The propagation of sound waves through a relatively non-absorptive mediam (damping fluid) involves the generation of vibrations in the elementary particles of the medium (damping fluid) through which the waves are propagating. While the transmitter 66 may be piezoelectric or magnetorestrictive device, other suitable devices may be used.

When the ultrasonic waves emitted by the transmitter 66 encounters the fluid flowing through orifice 45, their wavelength and frequency are modified proportionately to the fluid velocity. The receiver 68 is used to receive the ultrasonic waves of frequency $f_2$ and generate an output in response thereto. While the receiver 68 may be a piezoelectric or magnetorestrictive device, other suitable devices may be used.

For purposes of the following discussion, the ultrasonic waves generated by the transducer will be referred to as the "emitted" ultrasonic waves, while the ultrasonic waves received by the receiver 68 will be referred to as the "received" ultrasonic wave. When the piston 44 is stationary (static) with respect to the base valve 52, the received ultrasonic waves will have the same frequency as the emitted ultrasonic waves. When the piston 44 is stationary no flow is occurring and therefore the frequency of the transmitted wave $f_1$ will not be modified. As such, $f_2$ should substantially equal $f_1$. However, when the piston 44 is moving in a direction toward or away from the base valve 52, the frequency of the received ultrasonic waves will be different than the frequency of the emitted ultrasonic waves. In short, the wavelength of the received ultrasonic waves propagating through flowing fluid will be modified proportionately to the fluid velocity. This phenomenon is referred to as the Doppler Effect. As such the Doppler effect can be utilized in flowmeter devices to directly measure fluid velocity.

By using the Doppler Effect, the velocity of the damping fluid flowing through either the piston valving, base valving or any system passage may be determined. In this regard, the velocity of the fluid flowing within the system may be calculated according to either of the following equations:

$$\frac{f_2}{f_1} = 1 + \frac{v}{c} \quad (1)$$

$$\frac{f_b}{f_1} = \frac{v}{c} \quad (2)$$

where:

$f_1$ = frequency of the "emitted" ultrasonic waves generated by the transmitter 66.

$f_2$ = frequency of the "received" ultrasonic waves received by the receiver 68.

$f_b$ = "beating frequency" defined as $f_2 - f_1$ $v$ = velocity of the fluid flowing through valving orifice 45.

$c$ = velocity of wave propagation through the damping fluid.

The velocity of wave propagation "c" is largely dependent on the characteristics of the damping medium through which the waves propagate. While the preferred embodiment of the present invention uses hydraulic damping fluid as the damping medium, it is contemplated that the present invention can be readily adaptable to other suitable damping mediums as well.

To provide means for driving the transmitter 66, a wave generating circuit 72 is provided. The wave generating circuit 72 is electrically connected to the transmitter 66 so as to enable the transmitter 66 to produce emitted ultrasonic waves of a predetermined frequency $f_1$. When the piezoelectric crystal (not shown) of the transmitter 66 is excited by a sinusoidal voltage input, a finite time is required for it to reach an equilibrium state. Similarly, a finite time is taken for the crystal to stop vibrating once the electrical excitation has been removed. Consequently, the transmitter 66 should have a small modulation pulse width thereby permitting operation when there is a maximum velocity of fluid flowing through orifice 45. The control strategy is also able to discriminate between a first received wave and subsequent echoes due to the time between transmitted pulses being set longer than the acoustical damping time of the fluid. Preferably, the wave generating circuit 72 causes the emitted ultrasonic waves generated by the transmitter 66 to be of continuous form so as to enable efficient, continuous, real-time determinations of the fluid velocity flowing within damper 20 during movement of the vehicle suspension. While the wave generating circuit 72 may be an oscillator, other types of wave generating circuits such as pulse wave generators may be used.

Figure 4:
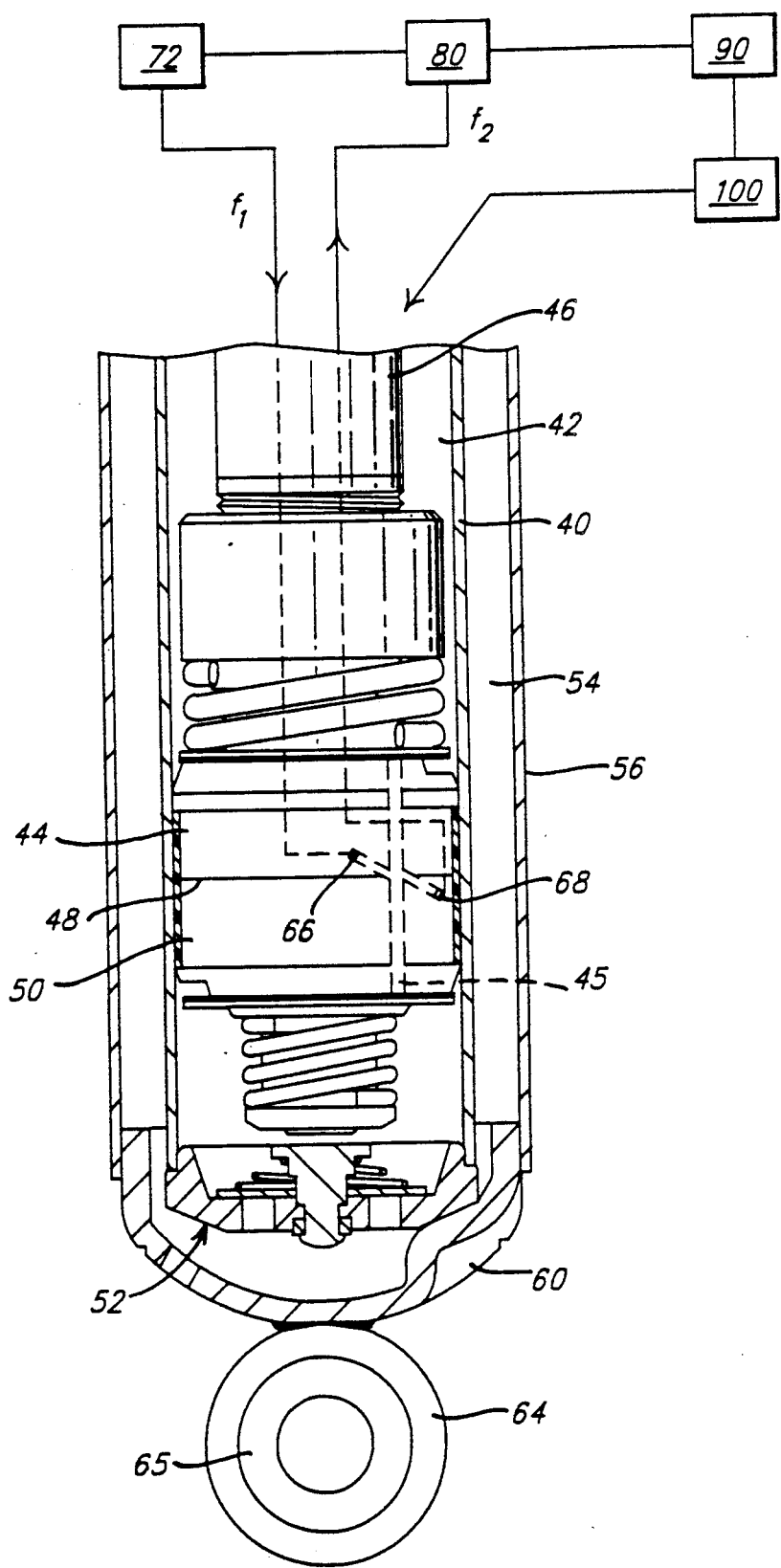
FIG. 4 is a block diagram illustrating the electrical components which are used for driving the transmitter and receiver shown in FIG. 8 and for changing a suspension characteristic of the damper.
Figure 3:
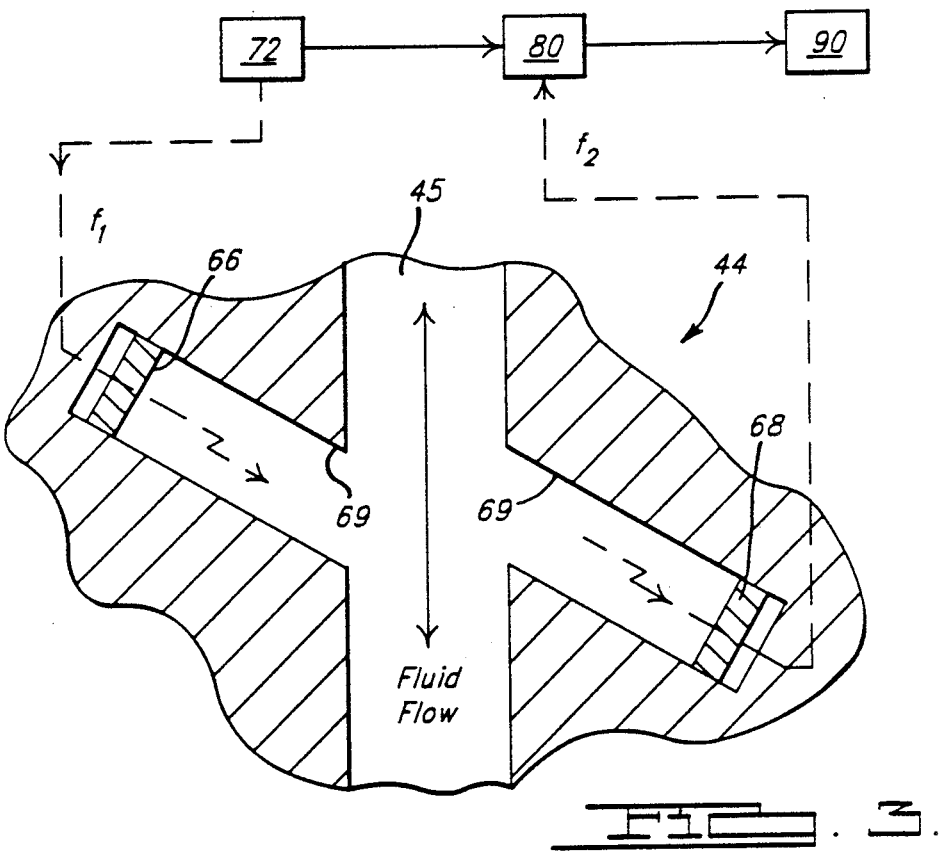
FIG. 3 is an enlarged cross-sectional view of FIG. 2 illustrating the relative location and operation of the ultrasonic transmitter and receiver devices shown in FIG. 2 according to a preferred embodiment of the present invention.

To provide means for detecting and measuring the change in frequency between the emitted ultrasonic waves $f_1$ and the received ultrasonic waves $f_2$, the damper 20 further comprises a frequency detection circuit 80. As shown in FIGS. 3 and 4, the frequency detection circuit 80 receive the output $f_1$ from the wave generating circuit 72 as well as $f_2$ from the receiver 68. The frequency detection circuit 80 determines the change in frequency by adding or "superimposing" the outputs from the wave generating circuit 72 and the receiver 68. Superimposition of the outputs corresponding to the emitted ultrasonic waves and the received ultrasonic waves is a frequency detection method commonly utilized in Doppler radar systems. As shown in equation (2), the superimposed "beat" frequency $f_b$ is linearly proportional to the fluid velocity v, so as to permit continuous detection of changes thereof. It is to be understood, however, that other suitable means for measuring the difference between the frequency of the reflected ultrasonic waves and the emitted ultrasonic waves may be used.

Upon determination of the "beat" frequency, the velocity of the fluid flowing through piston valve orifice 45 is calculated in the manner discussed above. Referring to FIG. 4, means for calculating the velocity of the fluid comprising a central electronic processor ("computer") 90 is disclosed. The computer 90 uses the output from the frequency detection circuit 80 to calculate the fluid velocity. After the velocity of the fluid has been determined by the computer 90, the computer 90 generates an output in response to the velocity calculation which may be used in various algorithms requiring information on fluid velocity. One such control scheme is to deliver the velocity calculation to a piston control circuit 100. The piston control circuit 100 then acts to change the damping characteristics of the piston 44 to obtain the desired road handling characteristics. While the preferred embodiment discloses the use of a piston control circuit to selectively vary damping characteristics, it is to be understood that other suspension control circuitry associated with suspension actuators are readily adaptable.

Velocity determinations can also be employed to provide positional and/or force information applicable to controlling active or dynamic leveling actuators instead of, or in addition to, damping control.

It is contemplated that the present invention may comprise various methods, currently utilized in doppler systems, for adjusting the velocity determination "v" to compensate for frequency changes due to variations in the temperature and viscosity of the damping medium. Such compensation can be incorporated into the computer software based on known characteristic of the damping fluid. Generally, such velocity correction methods include means for compensating for changes in the speed of wave propagation through the damping fluid due to the temperature and pressure effects on viscosity. One non-limiting example would include the application of a thermocouple device positioned within damper 20 to measure temperature variations. Such information would permit use of "look-up" tables by computer 90 to compensate for the temperature dependence of "c". While commonly used damping fluids have sufficiently low attenuation properties of up to about a frequency of 3 MHz, compensation means are still preferably used.

Figure 5:
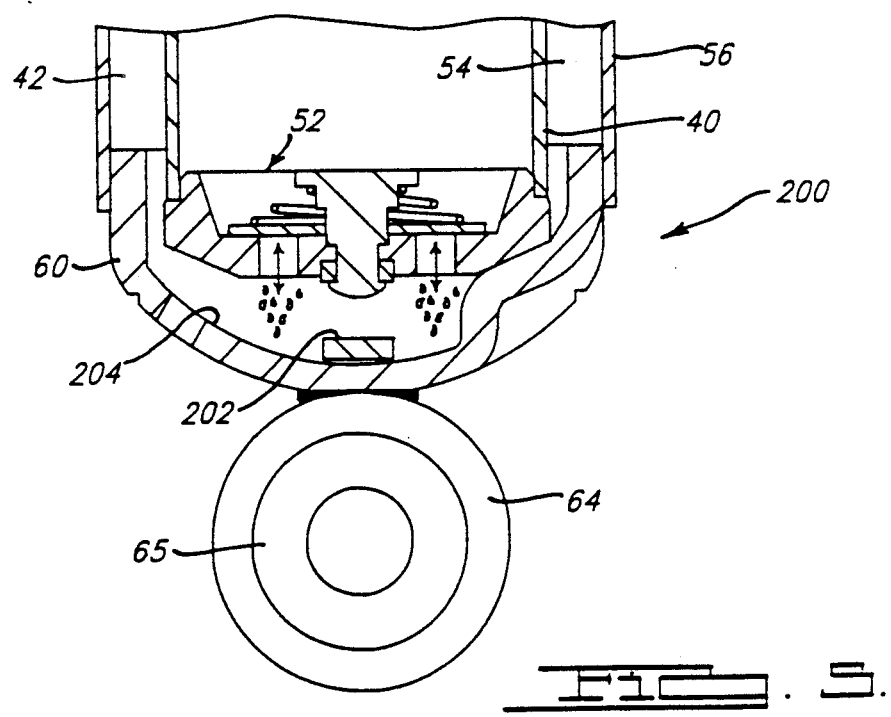
FIG. 5 is an enlarged side elevations view, partially broken away, of a second preferred embodiment of the present invention.

In reference to FIG. 5, a second embodiment of the present invention is disclosed. Specifically, shock absorber 200 comprises an acoustical transducer 202 acting as a transmitter/receiver which is secured to a lower surface 204 of end cap 60 substantially below, and in axial alignment with, base valve 52. The transducer 202 emits an ultrasonic sound wave of frequency $f_1$ in the direction of a lower surface of base valve 52. The emitted sound waves of frequency $f_1$ are back-scattered by elementary particles or air cavitation bubbles flowing with the fluid through base valve 52. When the piston 44 is stationary relative to the base valve 52, the frequency $f_2$ of the received waves reaching the transducer 202 will be substantially similar to $f_1$. As previously described, when the ultrasonic means of frequency $f_1$ encounters fluid flowing through an orifice in base valve 52, their frequency and wavelength are modified proportionately to the fluid velocity.

In order to use a single transducer 202 to emit and receive the ultrasonic sound waves, the transducer 202 must be capable of attentuating sound wave oscillations after transmission of wave $f_1$ in order to prevent overlap of the emitted and received pulses. Consequently the transducer should have a small modulation pulse width. However, it should be appreciated that an individual transmitter and receiver, aligned in adjacent orientation coulbe be employed. Likewise, while transducer 202 is shown centrally positioned relative to base valve 52 it is contemplated that the transducer can be positioned in any orientation which generates adequate sound wave reflections.

Preferably, total fluid flow through piston valve orifice 45 or base valve 52 should be measured. However, if the fluid flow paths in the piston valving of the base valve are symmetrical and substantially identical, it is possible to measure fluid velocity flowing through only one such orifice. Likewise, transducers in separate orifices for rebound and compression motion may be necessary if the piston valving warrants such structure.

While it is apparent that the preferred embodiments illustrated herein are well calculated to fill the objects stated above, it will be appreciated that the present invention is susceptible to modification, variation and change without departing from the scope of the invention. For example, it is contemplated that the frequency detection circuit 80, the computer 90 and wave generating circuit 70 may all be located either internal or external with respect to the damper. If located externally of the damper 20, a single computer 90 may be used to calculate the fluid velocity and control any suspension parameter (leveling, damping, springing, etc.) for each of the dampers in the vehicle suspension. Likewise, it is contemplated that the present invention can be employed in any passage or orifice through which fluid velocity changes correspond to a desired suspension characteristic.

What is claimed is:

1. A hydraulic actuator connecting the sprung and unsprung portions of a vehicle, said hydraulic actuator operable to selectively change a suspension parameter in response to changes in the velocity of damping fluid flowing within said hydraulic actuator, comprising:
   a first cylinder forming a working chamber operable to store damping fluid;
   a piston disposed within said first cylinder defining a first and a second portion of said working chamber, said piston being movable within said first cylinder;

valve means for metering the flow of damping fluid within said hydraulic actuator, said valve means having at least one flow passage;

transducer means for emitting and receiving sound waves propagating through said damping fluid flowing through said flow passage of said valve means;

means for driving said first transducer means so as to cause said first transducer means to emit sound waves;

measuring means for determining the change in frequency between said sound waves emitted and received by said transducer means and generating an output in response thereto; and means for calculating the velocity of said damping fluid flowing through said valve means in response to said output from said measuring means.

2. The hydraulic actuator according to claim 1 further comprising a control circuit operable to selectively change said suspension parameter in response to the velocity of said fluid flowing through said valve means.

3. The hydraulic actuator according to claim 2, wherein said actuator is a hydraulic direct acting, telescopic, shock absorber.

4. The hydraulic actuator according to claim 2 wherein said transducer means comprisng a first transducer emitting sound waves and a second transducer receiving said sound waves.

5. The hydraulic actuator according to claim 4, wherein the frequency of said sound waves emitted by said first transducer reside within the ultrasonic spectrum.

6. The hydraulic actuator according to claim 5, wherein said driving means comprises a wave generating circuit operable to cause said first transducer to generate ultrasonic waves.

7. The hydraulic actuator according to claim 6, wherein said wave generation circuit enables said first transducer to generate ultrasonic waves having a fixed controlled frequency and duration.

8. The hydraulic actuator according to claim 7, wherein said valve means comprises piston valving for metering the flow of damping fluid between said first and second portions of said working chamber during movement of said piston within said first cylinder.

9. The hydraulic actuator according to claim 8, wherein said first transducer comprises a transmitter integral with said piston valving and being operable to propagate ultrasonic waves through said damping fluid flowing through said flow passage, said flow passage providing fluid communication between said first and second portions of said working chamber, said transmitter being disposed substantially transverse to said flow passage.

10. The hydraulic actuator according to claim 9, wherein said second transducer comprises a receiver mounted within said piston valving substantially opposite said transmitter.

11. The hydraulic actuator according to claim 10, wherein said transmitter and said receiver comprise piezoelectric transducers.

12. The hydraulic actuator according to claim 11, wherein said transmitter and said receiver comprise magnetorestrictive transducers.

13. The hydraulic actuator according to claim 7, wherein said valve means comprises a base valve disposed between said first cylinder and a second cylinder at a lower portion of said actuator, said second cylinder coaxially aligned radially outwardly from said first cylinder to define a reservoir tube, said base valve metering the flow of damping fluid between said first and second cylinders during movement of said piston within said first cylinder.

14. The hydraulic actuator according to claim 13, wherein said first transducer means comprises a transmitter integral with said base valve and being operable to propagate ultrasonic waves through said damping fluid flowing through said flow passage, said flow passage providing fluid communication between said first and second cylinders, said transmitter being disposed substantially transverse to said flow passage.

15. The hydraulic actuator according to claim 13, wherein said second transducer means comprises a receiver integral with said base valve and mounted substantially opposite said transmitter across said flow passage.

16. The hydraulic actuator according to claim 1, wherein said measuring means comprises a frequency detection circuit operable to continuously generate an output in response to changes in frequency between said sound waves received by said second transducer means and said sound waves emitted by said first transducer means.

17. The hydraulic actuator according to claim 1, wherein said means for calculating the velocity of said damping fluid comprises a central electronic processor such as a computer.

18. A method of determining the velocity of damping fluid flowing through a valve passage in a direct acting shock absorber, said method comprising the steps of:

delivering an electrical signal generated by a wave generation circuit to an ultrasonic transmitter, said ultrasonic transmitter operable to emit ultrasonic sound waves of fixed and controlled frequency in response to said electrical signal generated by said wave generation signal;

directing said ultrasonic waves emitted by said ultrasonic transmitter to propagate transversely through said damping fluid flowing through said valve passage;

receiving said ultrasonic waves by an ultrasonic receiver positioned opposite to said ultrasonic transmitter in said valve passage;

providing measuring means for comparing the frequency of said ultrasonic waves received by said ultrasonic receiver and the frequency of said ultrasonic waves emitted by said ultrasonic transmitter and generating an output signal in response thereto;

calculating the fluid velocity of said damping fluid flowing through said valve passage in response to said output signal from said measuring means; and selectively changing a suspension parameter of said shock absorber in response to said fluid velocity calculation.

19. The method of claim 18 wherein said valve passage is associated with valve means for metering flow of damping fluid between first and second fluid storing means, said ultrasonic transmitter being mounted substantially transversely to said axially extending valve passage of said valve means.

20. The method of claim 19, wherein said step of comparing the frequency of said ultrasonic waves received by said ultrasonic receiver and the frequency of said ultrasonic waves emitted by said ultrasonic transmitter comprises delivering said outputs from said ultrasonic receiver and said wave generation circuit to a frequency detection circuit, said frequency detection circuit operable to continuously determine changes in frequency of said ultrasonic waves received by said ultrasonic receiver with respect to said ultrasonic waves emitted by said ultrasonic transmitter and generate said output signal in response thereto.

21. The method of claim 20, wherein said step of calculating said fluid velocity of said damping fluid flowing through said valve passage comprises delivering said output signal from said frequency detection circuit to a processor, said processor calculating said fluid velocity from said output.

22. The method of claim 21, wherein said processor determines said fluid velocity according to either of the following equations:

$$\frac{f_2}{f_1} = 1 + \frac{v}{c} \tag{1}$$

$$\frac{f_b}{f_1} = \frac{v}{c} \tag{2}$$

where:
$f_1$ = frequency of said ultrasonic waves emitted by said ultrasonic transmitter.
$f_2$ = frequency of said ultrasonic waves received by said ultrasonic receiver.
$f_b$ = "beating frequency" defined as $f_2 - f_1$
v = fluid velocity of said damping fluid flowing through said valve passage.
c = speed of propagation of said ultrasonic waves through said damping fluid.

23. A direct acting hydraulic shock absorber operable to selectively vary a suspension characteristic in response to the velocity of damping fluid flowing in said shock absorber, comprising:
a pressure cylinder forming a working chamber operable to store damping fluid;
a piston disposed within said pressure cylinder defining a first and second portion of said working chamber, said piston being movable with respect to said pressure cylinder and comprising piston valve means for metering the flow of damping fluid between said first and second portions of said working chamber during movement of said piston within said pressure cylinder;
a reservoir cylinder radially outwardly extending in coaxial relation with said pressure cylinder forming a reservoir operable to store damping fluid;
a base valve operably mounted between an end surface of said second portion of said working chamber and said reservoir cylinder, said base valve operable to meter the flow of damping fluid between said pressure cylinder and said reservoir cylinder during movement of said piston within said pressure cylinder;
first transducer means for emitting and transversely transmitting sound waves through said damping fluid flowing through one of said piston valve means and said base valve;
means for driving said first transducer means;
second tranducer means for receiving said sound waves from said first tranducer means, said second transducer means position substantially opposite said first transducer means;
a frequency detection circuit for measuring the difference in frequency of said sound waves emitted by said first transducer means and said sound waves received by said second transducer means and generating an output in response thereto; and
a central processor for calculating the velocity of said fluid from said output of said frequency detection circuit.

24. The direct acting hydraulic shock absorber according to claim 23 further comprising a piston control circuit for selectively controlling said piston valve means so as to change the flow of damping fluid in said shock absorber in response to the velocity of said fluid.

25. The direct acting hydraulic shock absorber according to claim 24, wherein said sound waves emitted by said first transducer means and said sound waves received by said second transducer means reside within the ultrasonic spectrum.

26. The direct acting hydraulic shock absorber according to claim 22, wherein said means for driving said first transducer means comprises a wave generation circuit, said wave generation circuit operable to cause said first transducer means to generate constant frequency ultrasonic waves.

27. The direct acting hydraulic shock absorber according to claim 26, wherein said first and second transducer means comprise piezoelectric devices.

28. The direct acting hydraulic shock absorber according to claim 27, wherein said first and second transducer means comprise magnetorestrictive devices.

29. The direct acting hydraulic shock absorber according to claim 27, wherein said frequency detection circuit continuously generates an output in response to changes in the frequency received by said second transducer means.

* * * * *

UNITED STATES PATENT AND TRADEMARK OFFICE
CERTIFICATE OF CORRECTION

PATENT NO. : 5,000.478
DATED : March 19, 1991
INVENTOR(S) : Michael W. Kerastas It is certified that error appears in the above-identified patent and that said Letters Patent is hereby corrected as shown below:

Column 2, line 5, after "road", insert --.--.

Column 3, line 50, "ca" should be --can--.

Column 4, line 11, "8" should be --3--.

Column 4, line 61, "58" should be --56--.

Column 5, line 3, "80" should be --60--.

Column 5, line 63, after "transducer", insert --66--.

Signed and Sealed this

Thirteenth Day of July, 1993

Attest:

MICHAEL K. KIRK

*Attesting Officer*  *Acting Commissioner of Patents and Trademarks*